(12) United States Patent
Inaba et al.

(10) Patent No.: US 12,072,541 B2
(45) Date of Patent: Aug. 27, 2024

(54) OPTICAL CONNECTOR

(71) Applicant: SUMITOMO ELECTRIC OPTIFRONTIER CO., LTD., Yokohama (JP)

(72) Inventors: Takahiro Inaba, Yokohama (JP); Yoshikyo Tamekuni, Yokohama (JP); Mitsumasa Seita, Komaki (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 203 days.

(21) Appl. No.: 17/948,517

(22) Filed: Sep. 20, 2022

(65) Prior Publication Data

US 2023/0113680 A1 Apr. 13, 2023

(30) Foreign Application Priority Data

Oct. 8, 2021 (JP) ................................. 2021-166165

(51) Int. Cl.
*G02B 6/38* (2006.01)
(52) U.S. Cl.
CPC ......... *G02B 6/3893* (2013.01); *G02B 6/3858* (2013.01); *G02B 6/3878* (2013.01)
(58) Field of Classification Search
CPC ... G02B 6/3858; G02B 6/3878; G02B 6/3893
See application file for complete search history.

(56) References Cited

U.S. PATENT DOCUMENTS

| | | | | | |
|---|---|---|---|---|---|
| 6,154,597 | A | * | 11/2000 | Roth | G02B 6/3825 385/139 |
| 9,625,658 | B1 | * | 4/2017 | Lin | G02B 6/3879 |
| 10,042,129 | B2 | * | 8/2018 | Taira | G02B 6/3885 |
| 10,545,296 | B2 | * | 1/2020 | Murray | G02B 6/3879 |
| 11,002,923 | B2 | * | 5/2021 | Ho | G02B 6/3879 |
| 11,056,820 | B2 | * | 7/2021 | Li | G02B 6/3879 |
| 11,333,836 | B2 | * | 5/2022 | Wong | G02B 6/3878 |
| 11,347,009 | B2 | * | 5/2022 | Ishikawa | G02B 6/387 |
| 11,867,871 | B2 | * | 1/2024 | Inaba | G02B 6/3878 |
| 2018/0341069 | A1 | * | 11/2018 | Takano | G02B 6/3888 |
| 2021/0255400 | A1 | | 8/2021 | Inaba et al. | |

* cited by examiner

*Primary Examiner* — Daniel Petkovsek
(74) *Attorney, Agent, or Firm* — Oliff PLC

(57) ABSTRACT

An optical connector includes first and second ferrules, first and second front housings each accommodating a corresponding ferrule of the first and second ferrules inside, an inner housing connected to rear ends of the first and second front housings, an outer housing including a first latch and accommodating the inner housing inside, and a tab disposed in a second direction intersecting a first direction with respect to the outer housing. The inner housing includes second latches disposed on first and second side portions respectively. The first and second side portions arranged in a third direction intersecting both the first direction and the second direction. The second latches include respective engaging portions that are engageable with the outer housing. Each of the engaging portions is pushed toward the inside of the inner housing to release a state of engagement between the inner housing and the outer housing.

10 Claims, 15 Drawing Sheets

OPTICAL CONNECTOR

CROSS-REFERENCE TO RELATED APPLICATION

This application is based upon and claims the benefit of the priority from Japanese Patent Application No. 2021-166165, filed on Oct. 8, 2021, the entire contents of which are incorporated herein by reference.

TECHNICAL FIELD

The present disclosure relates to an optical connector.

BACKGROUND

U.S. Unexamined Patent Publication No. 2021/0255400 discloses an optical connector. The optical connector includes: ferrules capable of holding respective optical fibers; front housings each accommodating a corresponding ferrule of the ferrules inside; an inner housing connected to rear ends of the front housings; and an outer housing accommodating the inner housing inside. Projections each having an inclined surface are provided on upper and lower surfaces of the inner housing, respectively. A hole is provided in a lower surface of the outer housing.

SUMMARY

The present disclosure provides an optical connector which has a front end and a rear end opposite to the front end in a first direction, and into which first and second optical fibers are insertable from the rear end. The optical connector includes first and second ferrules, first and second front housings, an inner housing, an outer housing, and a tab. The first and second ferrules hold the first and second optical fibers, respectively. Each of the first and second front housings accommodates a corresponding ferrule of the first and second ferrules inside. The inner housing is connected to rear ends of the first and second front housings. The outer housing includes a first latch which protrudes toward the front end along the first direction and of which a tip portion is configured to be engageable with an external device. The outer housing accommodates the inner housing inside. The tab is disposed in a second direction intersecting the first direction with respect to the outer housing. The tab is configured to move rearward along the first direction with respect to the outer housing to release a state of engagement between the first latch and the external device. The inner housing is configured to be insertable into and extractable from the outer housing in the first direction such that a polarity of the first and second front housings is changeable, by rotating 180° around a central axis along the first direction with respect to the outer housing. The inner housing includes second latches. The second latches are disposed on first and second side portions of the inner housing, respectively. The first and second side portions are arranged in a third direction intersecting both the first direction and the second direction. The second latches are exposed from the tab. The second latches include respective engaging portions that are engageable with the outer housing to restrict an extraction of the inner housing from the outer housing. Each of the engaging portions is configured to be elastically pushable toward an inside of the inner housing. Each of the engaging portions is pushed toward the inside of the inner housing to release a state of engagement between the inner housing and the outer housing.

DETAILED DESCRIPTION

Figure 1:
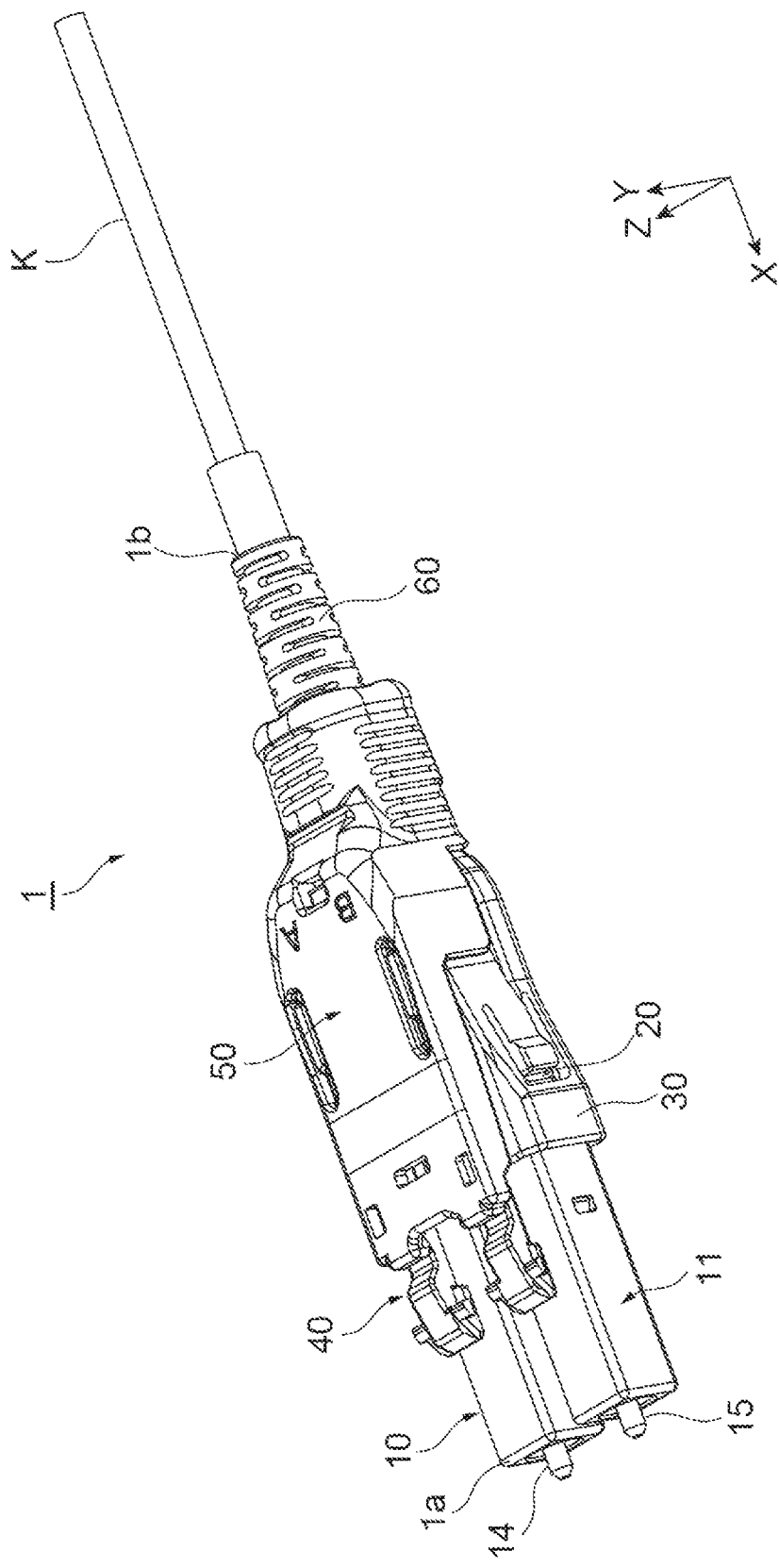
FIG. 1 is a perspective view illustrating an optical connector according to one embodiment.

Problems to be Solved by the Present Disclosure

The optical connector of U.S. Unexamined Patent Publication No. 2021/0255400 is configured such that the ferrules hold the respective optical fibers. In such an optical connector, for various reasons, a polarity of the optical fibers held by the ferrules may be changed. At that time, the polarity of the optical fibers is changed by removing the outer housing from the inner housing and by rotating the outer housing 180°. For this reason, the inner housing and the outer housing need to be insertably and extractably configured.

In the optical connector of U.S. Unexamined Patent Publication No. 2021/0255400, one of the projections provided on the respective upper and lower surfaces of the inner housing engages with the hole provided in the lower surface of the outer housing to prevent the unintentional extraction of the inner housing from the outer housing. The projection engages with the hole of the outer housing by the inclined surface such that the inner housing is extractable from the outer housing. For this reason, the state of engagement between the inner housing and the outer housing can be released by strongly pulling the outer housing in a direction in which the optical connector extends. However, when a force is applied to such an optical connector in a direction inclined with respect to the direction in which the optical connector extends, the state of engagement between the inner housing and the outer housing may be unintentionally released. Hereinafter, the direction inclined with respect to the direction in which the optical connector extends may be referred to as an "oblique direction". Particularly, when the optical connector is removed from the external device, if a force is applied to the optical connector in the oblique direction, the state of engagement between the inner housing and the outer housing may be unintentionally released. Therefore, it is desirable that the optical connector increases the engaging force between the inner housing and the outer housing to prevent the unintentional release of the state of engagement between the inner housing and the outer housing even when a force is applied in the oblique direction.

Effects of the Present Disclosure

According to the present disclosure, it is possible to provide the optical connector that increases the engaging force between the inner housing and the outer housing.

Explanation of Embodiments of the Present Disclosure

Initially, the contents of the present embodiment will be listed and described. According to one embodiment, there is provided an optical connector which has a front end and a rear end opposite to the front end in a first direction, and into which first and second optical fibers are insertable from the rear end. The optical connector includes first and second ferrules, first and second front housings, an inner housing, an outer housing, and a tab. The first and second ferrules hold the first and second optical fibers, respectively. Each of the first and second front housings accommodates a corresponding ferrule of the first and second ferrules inside. The inner housing is connected to rear ends of the first and second front housings. The outer housing includes a first latch which protrudes toward the front end along the first direction and of which a tip portion is configured to be engageable with an external device. The outer housing accommodates the inner housing inside. The tab is disposed in a second direction intersecting the first direction with respect to the outer housing, and is configured to move rearward along the first direction with respect to the outer housing to release a state of engagement between the first latch and the external device. The inner housing is configured to be insertable into and extractable from the outer housing in the first direction such that a polarity of the first and second front housings is changeable, by rotating 180° around a central axis along the first direction with respect to the outer housing. The inner housing includes second latches. The second latches are disposed on first and second side portions of the inner housing, respectively. The first and second side portions are arranged in a third direction intersecting both the first direction and the second direction. The second latches are exposed from the tab. The second latches include respective engaging portions that are engageable with the outer housing to restrict an extraction of the inner housing from the outer housing. Each of the engaging portions is configured to be elastically pushable toward an inside of the inner housing. Each of the engaging portions is pushed toward the inside of the inner housing to release a state of engagement between the inner housing and the outer housing.

In the optical connector, the engaging portions of the second latches included in the inner housing are pushed to the inside of the inner housing to release the state of engagement between the inner housing and the outer housing. Namely, in a state where the engaging portions of the second latches are not pushed to the inside of the inner housing, the state of engagement between the inner housing and the outer housing is difficult to release. Therefore, when the optical connector is removed from the external device, even in a case where a force is applied to the optical connector in the oblique direction, the state of engagement between the inner housing and the outer housing is difficult to release. According to the optical connector, the engaging force between the inner housing and the outer housing is increased. The external device mentioned herein includes, for example, an adapter that connects optical connectors and an optical transceiver that connects optical connectors. The second latches are disposed on the first and second side portions which are arranged in the third direction and on which the tab is not provided, respectively. Accordingly, the second latches can be easily pinched with the fingers, and the second latches can be easily pushed to the inside of the inner housing.

In the optical connector, the second latches may include respective body portions, and each of the body portions may be an elastic body extending toward the front end. Each of the engaging portions may be located at a front end of each of the body portions. In this case, the engaging portions can be elastically pushed to the inside of the inner housing since each of the body portions is an elastic body.

In the optical connector, the outer housing may include a first and second pushing portions that are disposed above the body portions of the second latches, respectively. The first and second pushing portions protrude to an outside of the outer housing. Each of the first and second pushing portions may be supported to be elastically pushable toward an inside of the outer housing. When the state of engagement between the inner housing and the outer housing is released, each of the first and second pushing portions may be configured to push each of the engaging portions to the inside of the inner housing by pushing each of the body portions of the second latches. In this case, the engaging portions of the inner housing are pushed to the inside of the inner housing in connection with the pushing of the first and second pushing portions of the outer housing. Therefore, the state of engagement between the inner housing and the outer housing can be released without directly pushing the engaging portions of the inner housing accommodated inside the outer housing. Accordingly, the state of engagement between the inner housing and the outer housing can be smoothly released, and the attachability and detachability of both is improved. In the configuration in which the first and second pushing portions protrude to the outside of the outer housing, a worker can easily push each of the first and second pushing portions to the inside of the outer housing.

In the optical connector, the inner housing may include first and second projections disposed on first and second outer surfaces facing each other in the second direction, respectively. The outer housing may include first and second portions facing the first and second outer surfaces of the inner housing, respectively. An opening may be formed in each of the first and second portions of the outer housing. Each of the projections may include an inclined surface that engages with the opening to restrict the extraction of the inner housing from the outer housing. In this case, the engaging force between the inner housing and the outer housing is reliably increased.

In the optical connector, each of the engaging portions may include an engaging surface configured to engage with the outer housing. The engaging surface may be perpendicular to the first direction. In this case, the engaging force between the inner housing and the outer housing is more reliably increased.

Details of Embodiment of Present Disclosure

A specific example of an optical connector according to the present disclosure will be described below with reference to the drawings. It should be noted that the present invention is not limited to these examples, but is defined by the scope of claims and intended to include all modifications within the meaning and scope equivalent to the scope of claims. In the following description, like elements are denoted by like reference numerals in the description of the drawings, and redundant descriptions thereof will be omitted.

Figure 2:
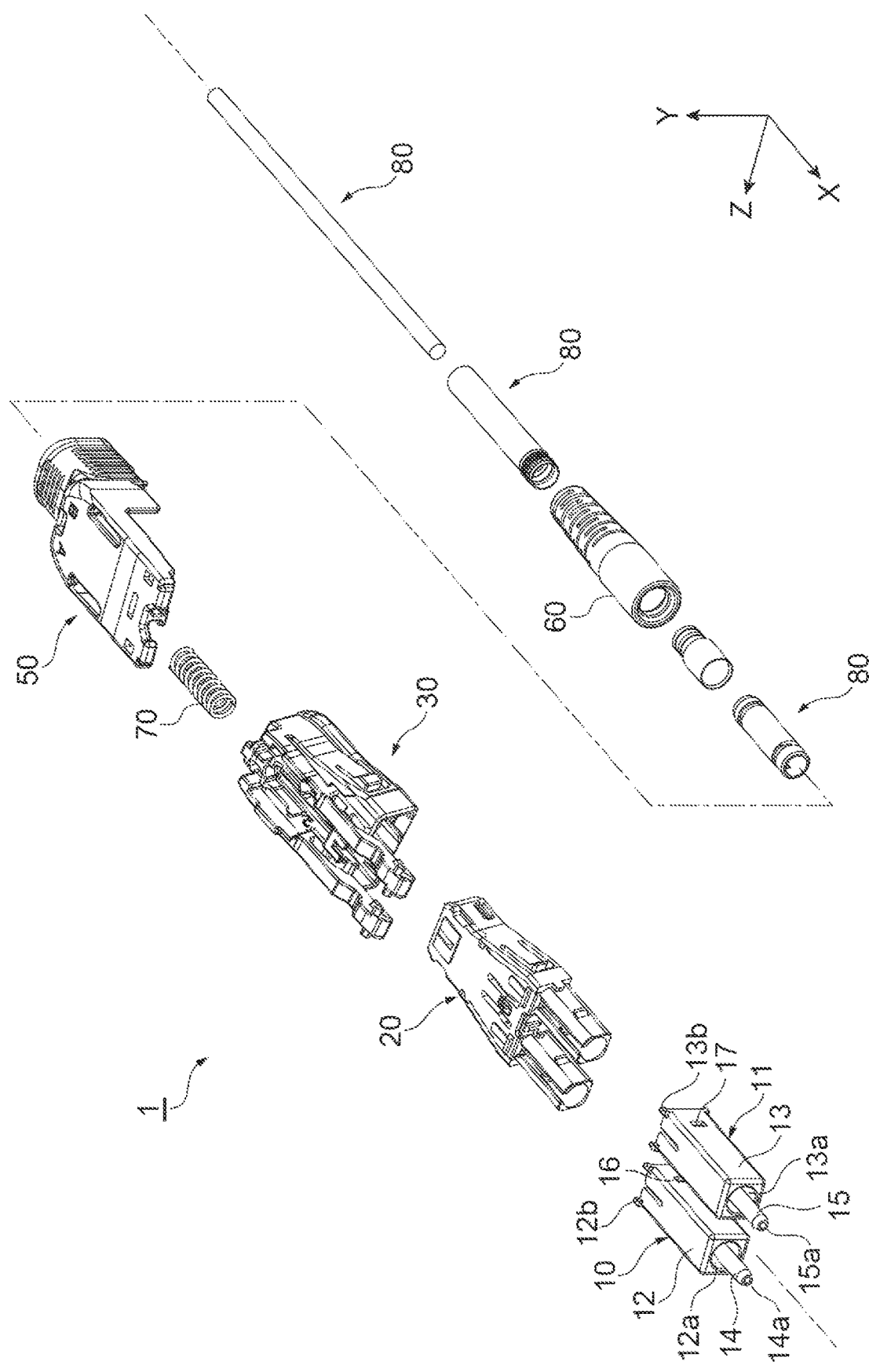
FIG. 2 is an exploded perspective view illustrating the optical connector according to one embodiment.

A configuration of an optical connector 1 according to the present embodiment will be described with reference to FIGS. 1 and 2. FIG. 1 is a perspective view illustrating the optical connector according to the present embodiment. FIG. 2 is an exploded perspective view illustrating the optical connector according to the present embodiment. As illustrated in FIGS. 1 and 2, the optical connector 1 includes front housings 10 and 11 (first and second front housings), ferrules 14 and 15 (first and second ferrules), an inner housing 20, an outer housing 30, a tab 50, a boot 60, an elastic member 70, and a cable holding member 80. As illustrated in FIG. 1, the optical connector 1 is a connector having a shape that is elongated in a longitudinal direction X, and has a front end 1a and a rear end 1b. The rear end 1b is located opposite to the front end 1a in the longitudinal direction X. An optical cable K held by the optical connector 1 is inserted from the rear end 1b of the optical connector 1. A coating resin of a pair of optical fibers (first and second optical fibers) encapsulated in the optical cable K is removed inside the optical connector 1, and the optical fibers are accommodated and held by the respective ferrules 14 and 15. The optical connector 1 is, for example, a duplex LC connector, and is a uniboot type optical connector. The optical connector 1 may be an optical connector having another configuration.

As illustrated in FIG. 2, the front housings 10 and 11 include bodies 12 and 13, respectively. The bodies 12 and 13 are made of synthetic resin, and have a quadrangular prism outer shape inside which round holes 12a and 13a are provided, respectively. The bodies 12 and 13 accommodate the ferrules 14 and 15 capable of holding the respective optical fibers, in the round holes 12a and 13a, respectively, such that tips 14a and 15a of the ferrules 14 and 15 are exposed to the outside at the front end 1a of the optical connector 1. Tips of the held optical fibers are exposed from the tips 14a and 15a of the ferrules 14 and 15. The tips 14a and 15a of the ferrules 14 and 15 may be surfaces parallel to an up-down direction Y intersecting the longitudinal direction X, or may be surfaces inclined with respect to the up-down direction Y. Projections 12b and projections 13b are provided at four respective corners of rear ends of the bodies 12 and 13. When the front housings 10 and 11 are connected to a front end of the inner housing 20, the projections 12b and the projections 13b define a positional relationship between the front housings 10 and 11 and the inner housing 20. A pair of opening portions 16 each having a rectangular shape are provided in both respective side surfaces of the front housing 10, and a pair of opening portions 17 each having a rectangular shape are provided in both respective side surfaces of the front housing 11.

Figure 3:
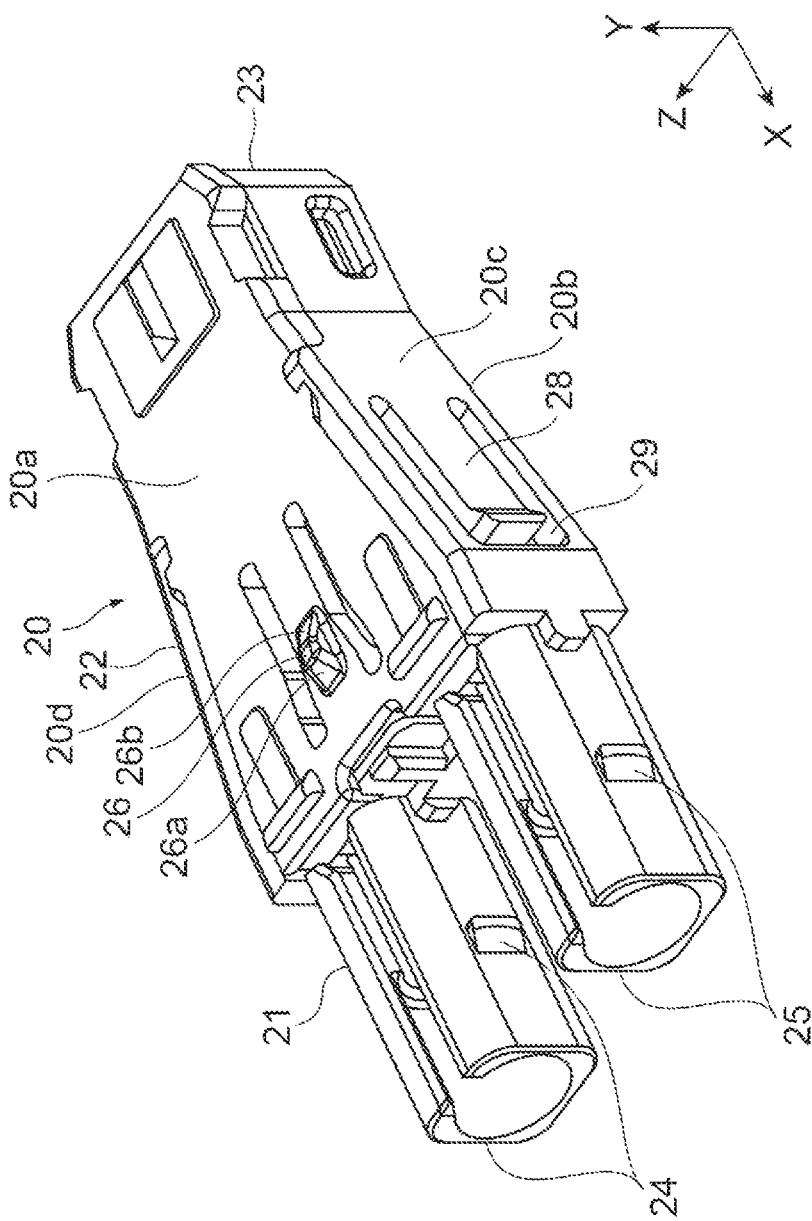
FIG. 3 is a perspective view illustrating an inner housing.
Figure 4:
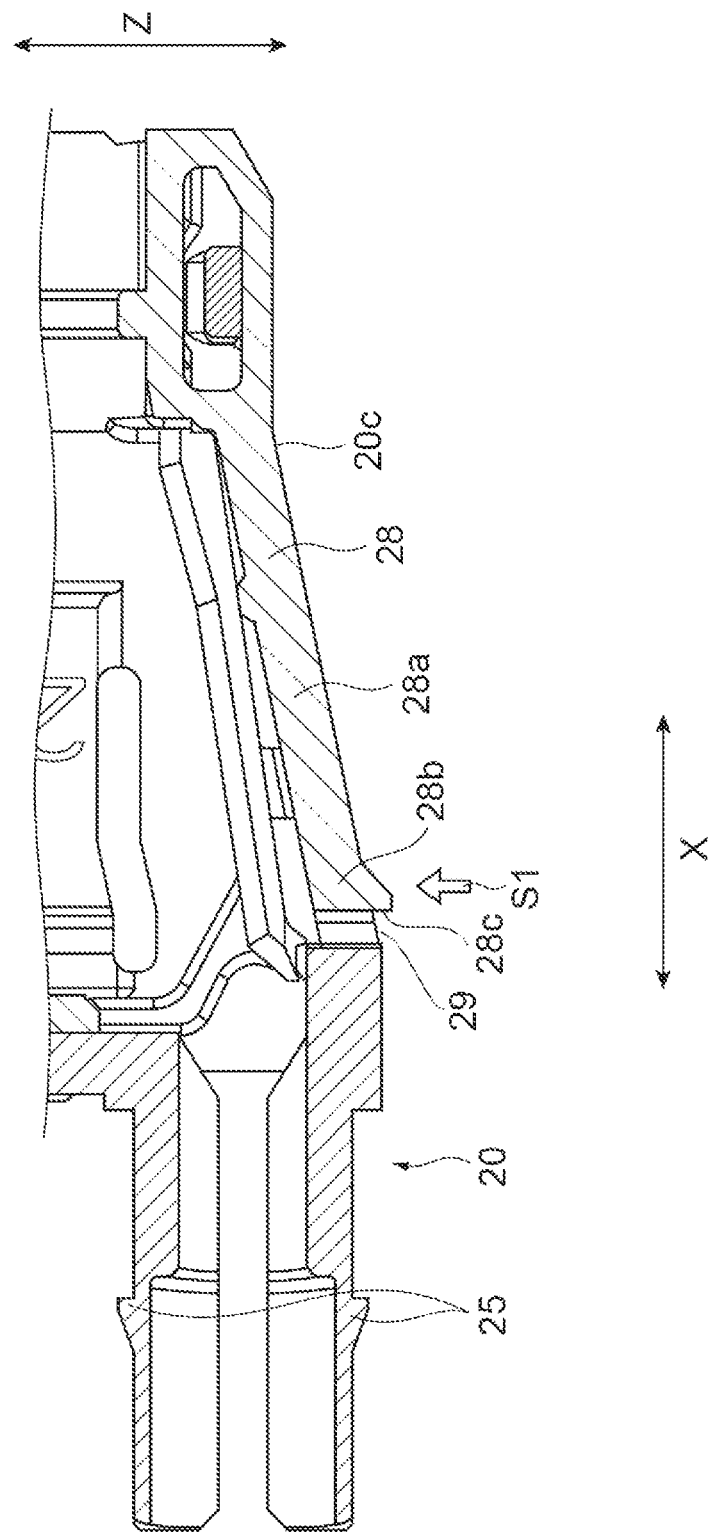
FIG. 4 is a view illustrating a cross-sectional configuration of the inner housing.

A configuration of the inner housing 20 will be described with reference to FIGS. 3 and 4. FIG. 3 is a perspective view illustrating the inner housing. FIG. 4 is a view illustrating a cross-sectional configuration of the inner housing taken along a lateral direction Z intersecting both the longitudinal direction X and the up-down direction Y and along the longitudinal direction X.

The inner housing 20 is a housing inside which a space capable of accommodating the optical fibers is formed, and is made of synthetic resin. The inner housing 20 includes a front end portion 21, a tapered portion 22, and a rear end portion 23, and is formed such that an internal space of the tapered portion 22 gradually expands from a rear end toward the front end. The inner housing 20 is a region in which the pair of optical fibers encapsulated in the optical cable K branch into the respective ferrules 14 and 15, and is connected to the rear ends of the front housings 10 and 11. A pair of latches 24 and a pair of latches 25 are provided at the front end portion 21 of the inner housing 20, the latches 24 are inserted into and engage with the respective opening portions 16 of the front housing 10 from the inside, and the latches 25 are inserted into and engage with the opening portions 17 of the front housing 11 from the inside. Accordingly, the front housings 10 and 11 are connected to the inner housing 20.

Figure 6:
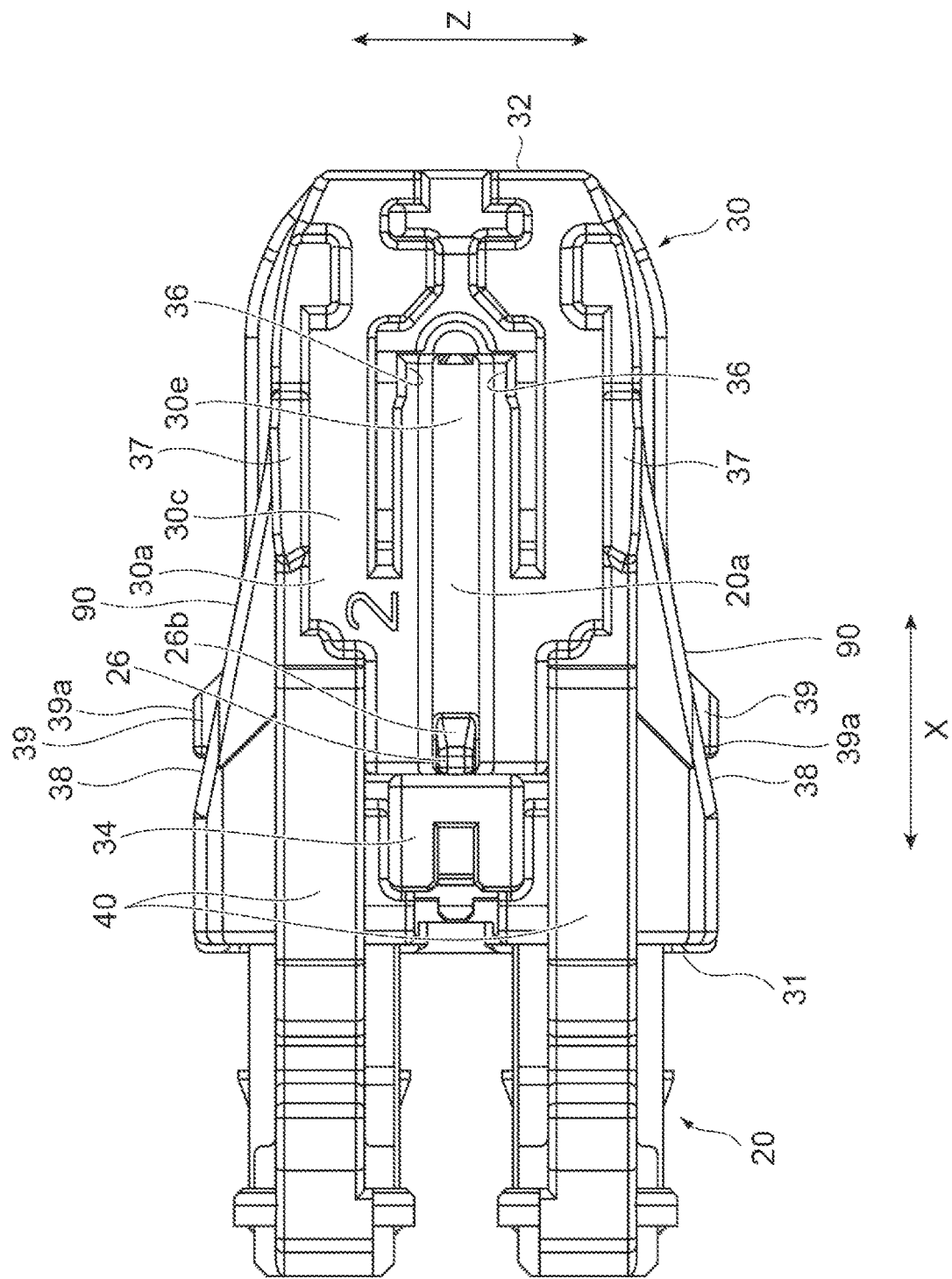
FIG. 6 is a view illustrating the inner housing and the outer housing.
Figure 7:
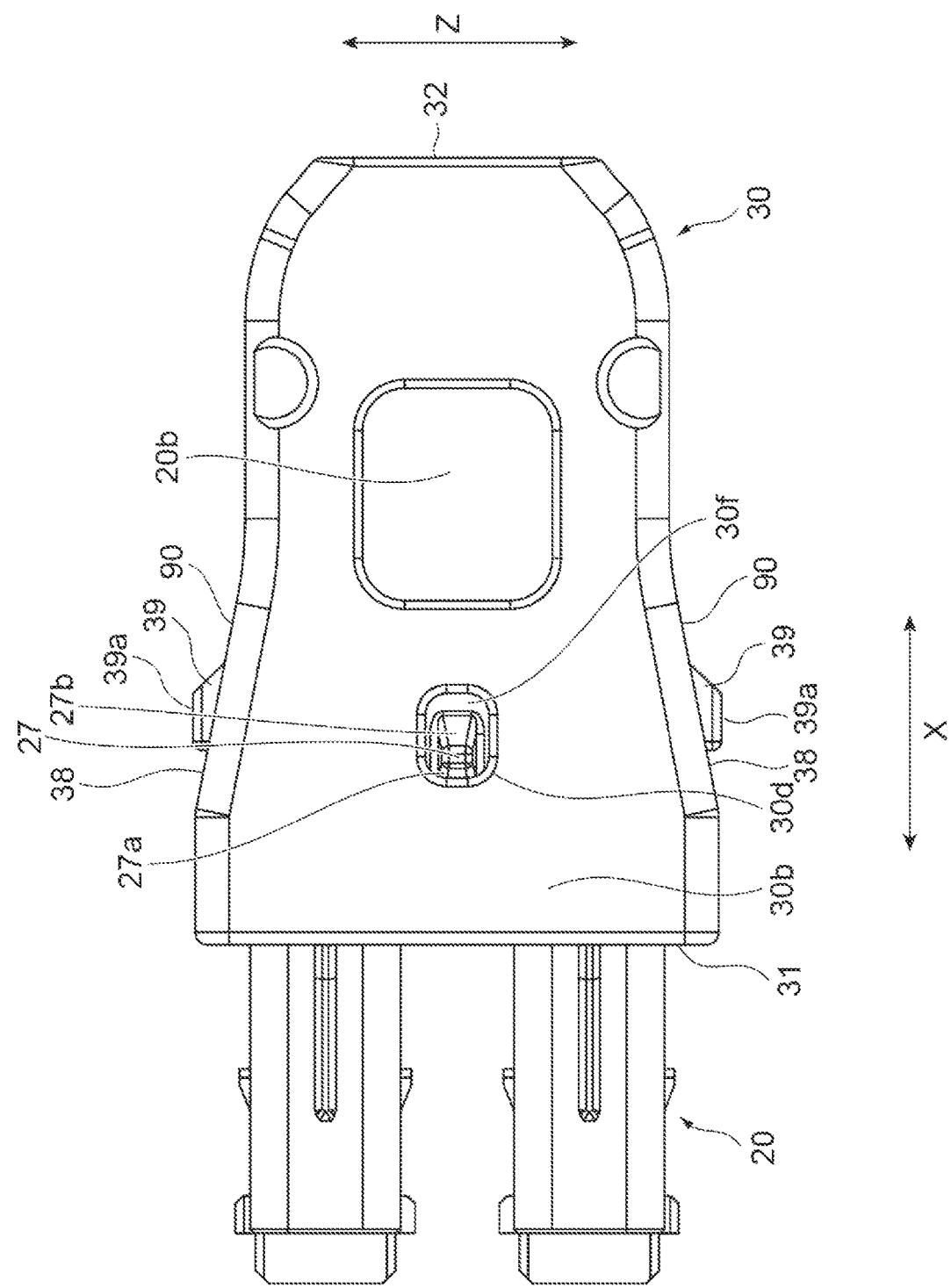
FIG. 7 is a view illustrating the inner housing and the outer housing.

The inner housing 20 includes projections 26 and 27 (first and second projections) that are disposed on outer surfaces 20a and 20b (first and second outer surfaces), respectively, which face each other in the up-down direction Y (refer to FIGS. 6 and 7). Each of the projections 26 and 27 is provided in the vicinity of a location slightly in front of a center of the corresponding outer surface of the outer surfaces 20a and 20b. In the present embodiment, the projection 26 is disposed on the outer surface 20a, and the projection 27 is disposed on the outer surface 20b. The projection 26 includes inclined surfaces 26a and 26b, and the projection 27 includes inclined surfaces 27a and 27b. The inclined surface 26a and the inclined surface 27a are located close to the front end 1a, and the inclined surface 26b and the inclined surface 27b are located close to the rear end 1b. The inclined surfaces 26a and 26b and the inclined surfaces 27a and 27b each are inclined toward the inside of the inner housing 20 with respect to the up-down direction Y.

The inner housing 20 includes latches 28 (second latches) that are disposed on side portions 20c and 20d (first and second side portions) arranged in the lateral direction Z respectively. The latches 28 are exposed from the tab 50. Each of the latches 28 includes a body portion 28a having a rod shape and extending toward the front end 1a, and an engaging portion 28b located at a front end of the body portion 28a. Namely, the body portion 28a is integrated with portions of the inner housing 20 other than the latch 28, at a rear end of the latch 28, and the engaging portion 28b is located at a front end of the latch 28. In the present embodiment, the body portion 28a and the engaging portion 28b are integrally formed, and the body portion 28a and the engaging portion 28b are continuous with each other. An extending direction of the body portion 28a is inclined with respect to the longitudinal direction X of the optical connector 1 to separate from a central axis of the optical connector 1 in the lateral direction Z as the body portion 28a approaches the front end. Each of the latches 28 of the present embodiment is surrounded by a slit 29 from three sides except the rear end, the slit 29 having a U shape and being formed in the side portion 20c (20d), and a contour of the latch 28 is formed by the slit 29. The engaging portion 28b is configured to be elastically pushable in a direction of arrow S1 along the lateral direction Z (refer to FIG. 4), namely, toward the inside of the inner housing 20 by the elasticity of the body portion 28a. Each of the engaging portions 28b includes an engaging surface 28c configured to engage with the outer housing 30. Each of the engaging surfaces 28c is, for example, a flat surface that faces the front and that is perpendicular to the longitudinal direction X.

Figure 5:
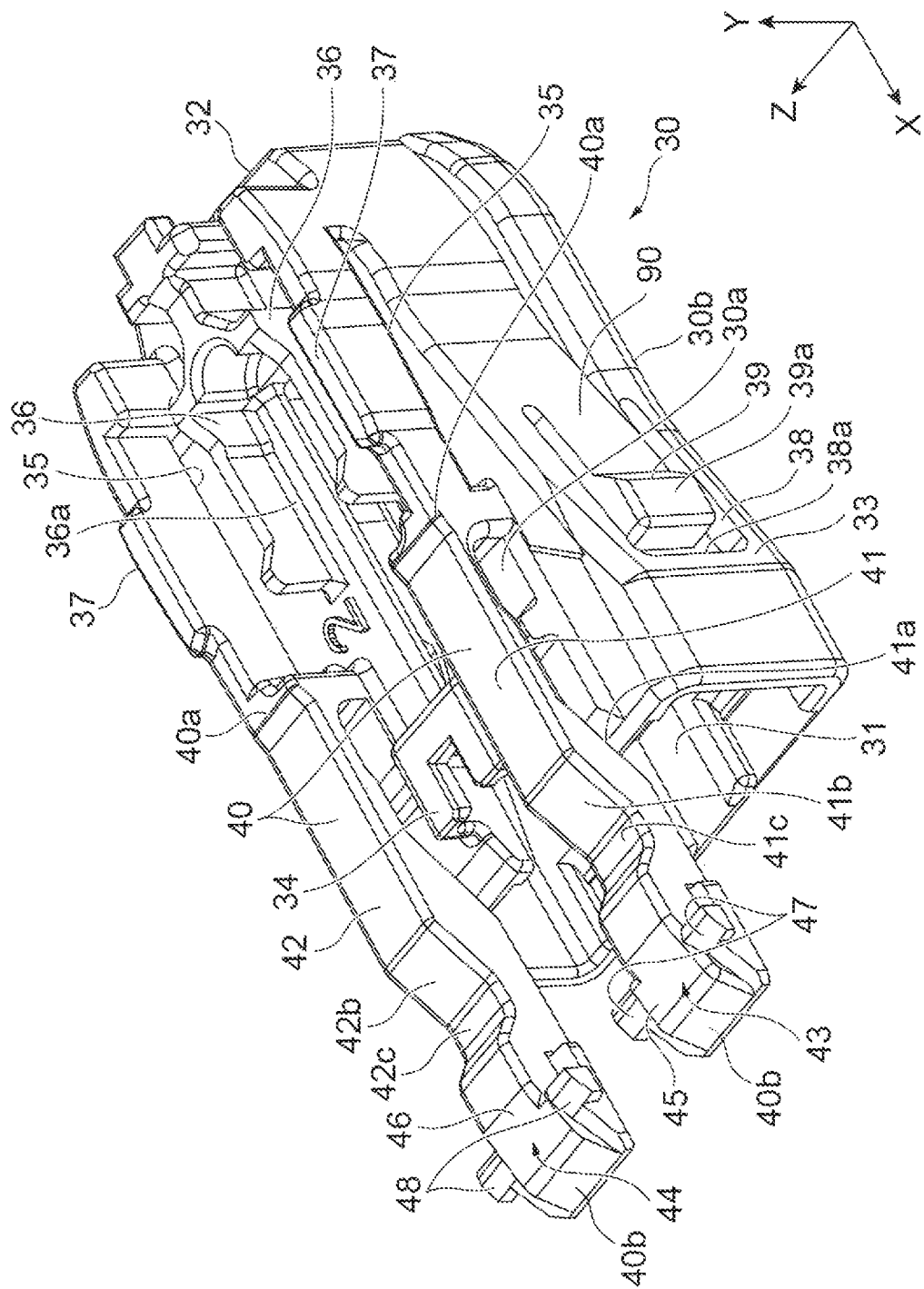
FIG. 5 is a perspective view illustrating an outer housing.
Figure 8:
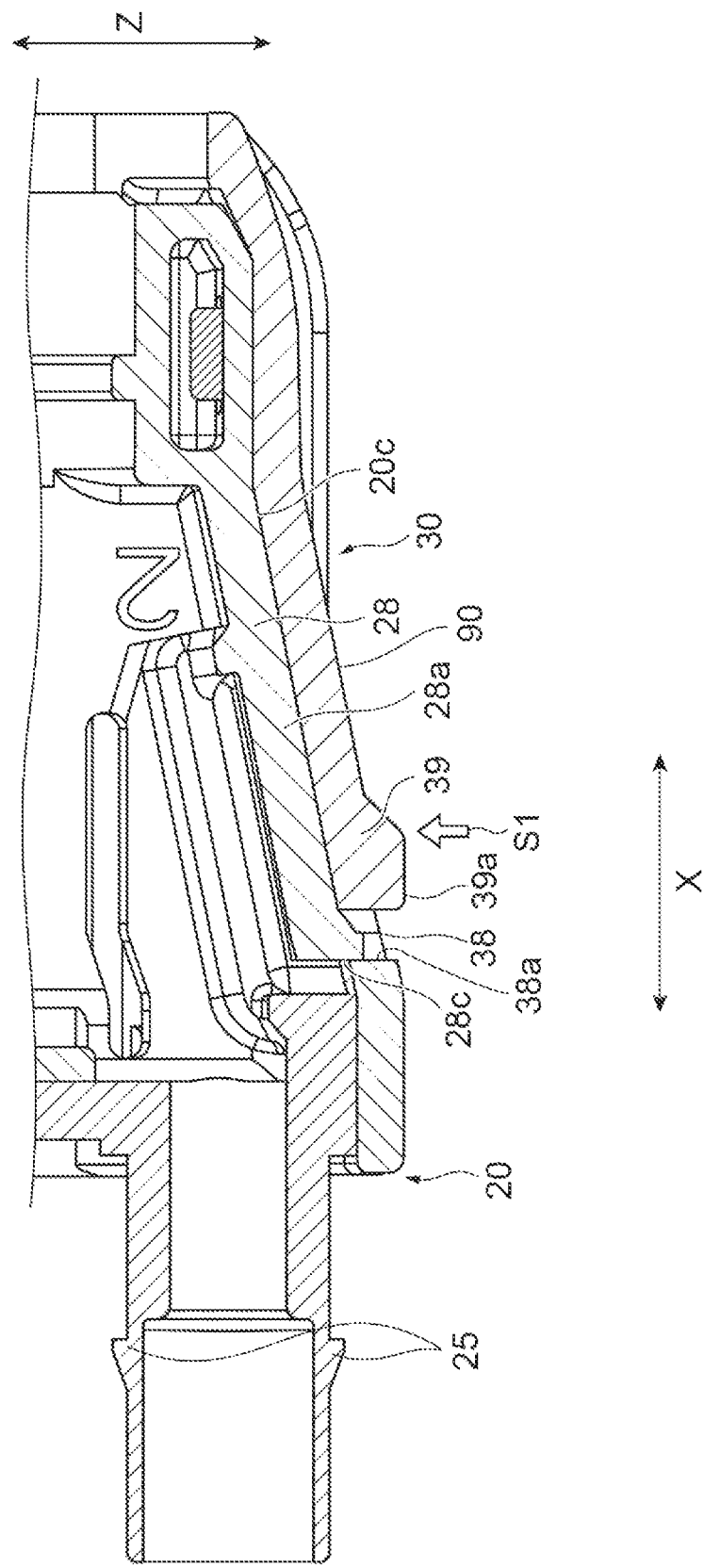
FIG. 8 is a view illustrating a cross-sectional configuration of the inner housing and the outer housing.

A configuration of the outer housing 30 will be described with reference to FIGS. 5 to 8. FIG. 5 is a perspective view illustrating the outer housing. FIGS. 6 and 7 are views illustrating a state where the inner housing and the outer housing are coupled to each other. FIG. 8 is a view illustrating a cross-sectional configuration of the inner housing and the outer housing taken along the longitudinal direction X and along the lateral direction Z.

The outer housing 30 is a housing that accommodates the inner housing 20 inside and that is connected to the inner housing 20. The outer housing 30 includes a housing body 33 having openings 31 and 32 in the front and in the rear, respectively. A pair of wall portions 36 that define a portion 36a thereinside and a pair of guide projections 37 located outside the wall portions 36 are provided on an upper surface 30a of the outer housing 30, the portion 36a accommodating the elastic member 70. The elastic member 70 accommodated in the portion 36a is disposed between the outer housing 30 and the tab 50. For this reason, the elastic member 70 functions to return the tab 50 to a normal position when the tab 50 is moved close to the rear end 1b with respect to the outer housing 30. The elastic member 70 is, for example, a compression coil spring. The guide projections 37 are located inside slits 55 and 56 (refer to FIG. 10) of the tab 50 when the tab 50 is connected to the outer housing 30, respectively, to guide a movement of the tab 50 along the longitudinal direction X. The outer housing 30 includes a protrusion portion 34 provided on a front side, and a slit 35 for connection provided below each of the guide projections 37, as a structure for connection to the tab 50.

As illustrated in FIGS. 6 and 7, the outer housing 30 includes portions 30c and 30d (first and second portions) that face the outer surfaces 20a and 20b of the inner housing 20, respectively. The portions 30c and 30d face each other in the up-down direction Y with the inner housing 20 interposed therebetween. The upper surface 30a includes an outer surface of the portion 30c. A lower surface 30b includes an outer surface of the portion 30d. An opening 30e is formed in the portion 30c, and an opening 30f is formed in the portion 30d. As illustrated in FIGS. 6 and 7, when the inner housing 20 are coupled with the outer housing 30, each of the projections 26 and 27 enters the corresponding opening of the openings 30e and 30f. In the present embodiment, the projection 26 and the projection 27 enter the opening 30e and the opening 30f, respectively. Since the projections 26 and 27 of the inner housing 20 enter the openings 30e and 30f of the outer housing 30, respectively, the extraction of the inner housing 20 from the outer housing 30 is prevented.

As illustrated in FIGS. 5 to 8, the outer housing 30 includes a pair of pushing portions 39 (first and second pushing portions). The pushing portions 39 are disposed above the body portions 28a of the latches 28, respectively, and protrude to the outside of the outer housing 30. The pushing portions 39 are disposed on a pair of respective side surfaces of the outer housing 30 arranged in the lateral direction Z. Therefore, the pushing portions 39 are exposed from the tab 50. When the inner housing 20 and the outer housing 30 are in a coupled state, each of the pushing portions 39 is in contact with the corresponding body portion 28a. Each of the pushing portions 39 is elastically supported by an elastic support portion 90 so as to be pushable toward the inside of the outer housing 30. The elastic support portion 90 extends along the body portion 28a of the corresponding latch 28. Each of the pushing portions 39 has a side surface 39a opposite to a surface that comes into contact with the body portion 28a. The side surface 39a is a flat surface perpendicular to the lateral direction Z. A pair of slits 38 (first and second slits) are provided in the pair of respective side surfaces of the outer housing 30, as a structure for engagement with the latches 28 of the inner housing 20. Each of the slits 38 is formed closer to the front end 1a than the corresponding pushing portion 39. In the present embodiment, each of the slits 38 is formed to surround a periphery of each of the pushing portions 39 from three sides except the elastic support portion 90 of each of the pushing portions 39. In other words, each of the slits 38 forms a contour of each of the pushing portions 39. The slits 38 have engaging surfaces 38a. Each of the engaging surfaces 38a is configured such that the engaging portion 28b is caught from the inside. Each of the engaging surfaces 38a is, for example, a flat surface that faces the rear and that is perpendicular to the longitudinal direction X. The latches 28 of the inner housing 20 and the slits 38 of the outer housing 30 engage with each other, and the extraction of the inner housing 20 from the outer housing 30 is prevented.

Figure 9:
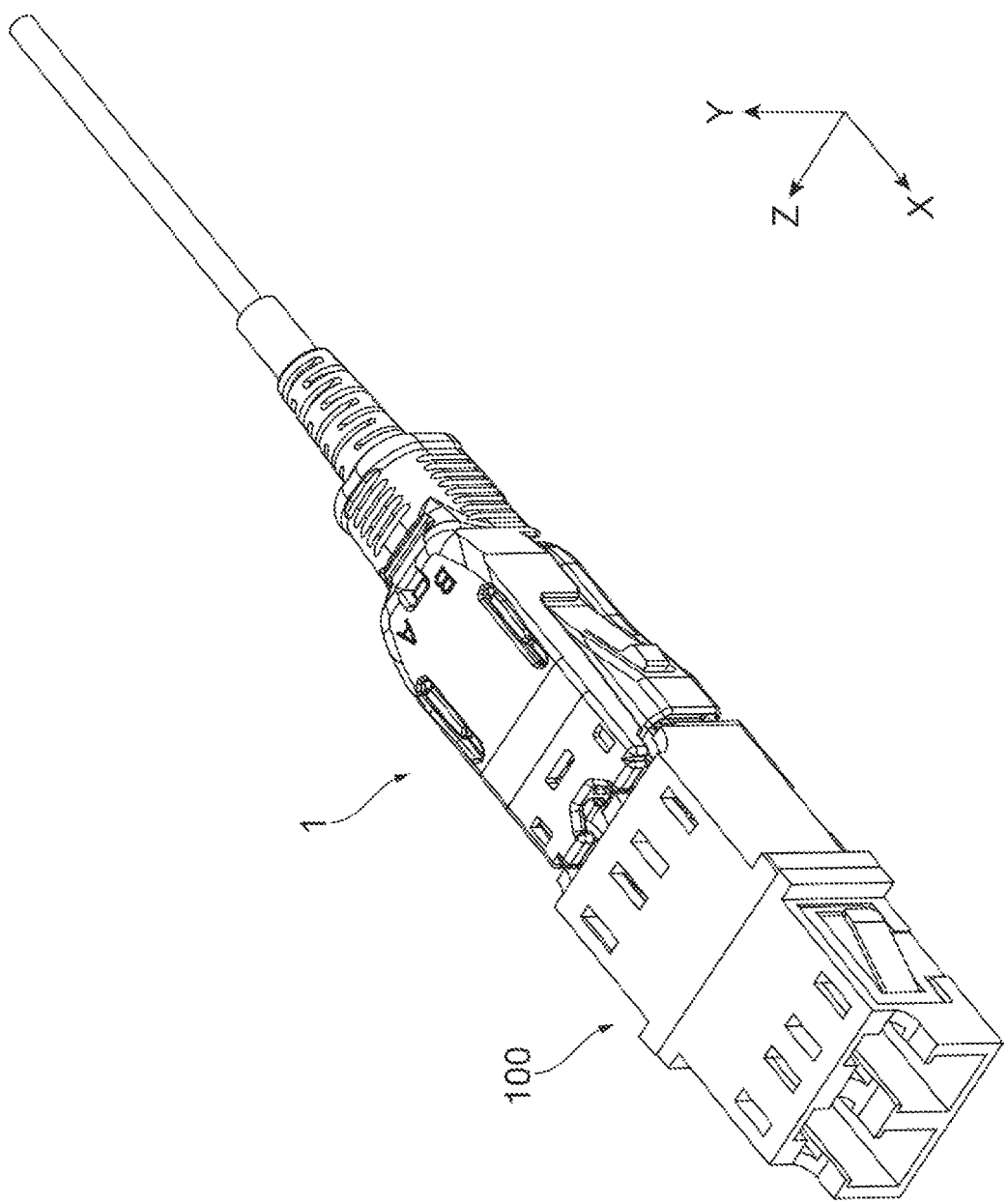
FIG. 9 is a perspective view illustrating the optical connector and an adapter according to one embodiment.

The outer housing 30 includes a latch 40 (first latch) protruding toward the front end 1a along the longitudinal direction X. The latch 40 includes members 41 and 42 that are latch members extending toward the front end 1a along the longitudinal direction X. FIG. 9 is a perspective view illustrating a state where the optical connector according to the present embodiment is inserted into an adapter. Tip portions 40b of the members 41 and 42 of the latch 40 are provided with engaging portions 43 and 44, respectively. The engaging portions 43 and 44 are engageable with an external device such as an adapter 100 illustrated in FIG. 9. For example, the engaging portions 43 and 44 include engaging bodies 45 and 46 extending along the longitudinal direction X, respectively, and include a pair of engaging protrusion portions 47 and a pair of engaging protrusion portions 48, respectively. The pair of engaging protrusion portions 47 and the pair of engaging protrusion portions 48 protrude outward from the engaging bodies 45 and 46 along the lateral direction Z intersecting both the longitudinal direction X and the up-down direction Y. For example, when the longitudinal direction X defines a first direction and the up-down direction Y defines a second direction, the lateral direction Z defines a third direction. The engaging protrusion portions 47 and 48 of the engaging portions 43 and 44 engage with engaging portions inside the adapter 100, so that the extraction of the optical connector 1 from the adapter 100 is prevented. Before the optical connector 1 is attached to the adapter 100, the tip portions 40b of the latch 40, namely, the engaging portions 43 and 44 are separated from the front housings 10 and 11 and stay in the air.

Inclined surfaces 41a and 42a, inclined surfaces 41b and 42b, and recessed portions 41c and 42c are provided in the vicinities of centers of the members 41 and 42 of the latch 40. The inclined surfaces 41a and 42a are provided on an inner side of the latch 40. The inclined surfaces 41b and 42b are provided on an outer side of the latch 40, and form a part of the recessed portions 41c and 42c, respectively. The members 41 and 42 of the latch 40 may be formed with the same thickness as a whole, or a plate thickness of an end 40a may be thinner than a plate thickness in a region in which the inclined surfaces 41a and 42a or the inclined surfaces 41b and 42b are located. In this case, the tip portions 40b of the latch 40, namely, the engaging portions 43 and 44 are more smoothly moved in the up-down direction with the end 40a as a fulcrum. The plate thickness mentioned herein means a thickness in a direction perpendicular to a plane at each location.

Figure 10:
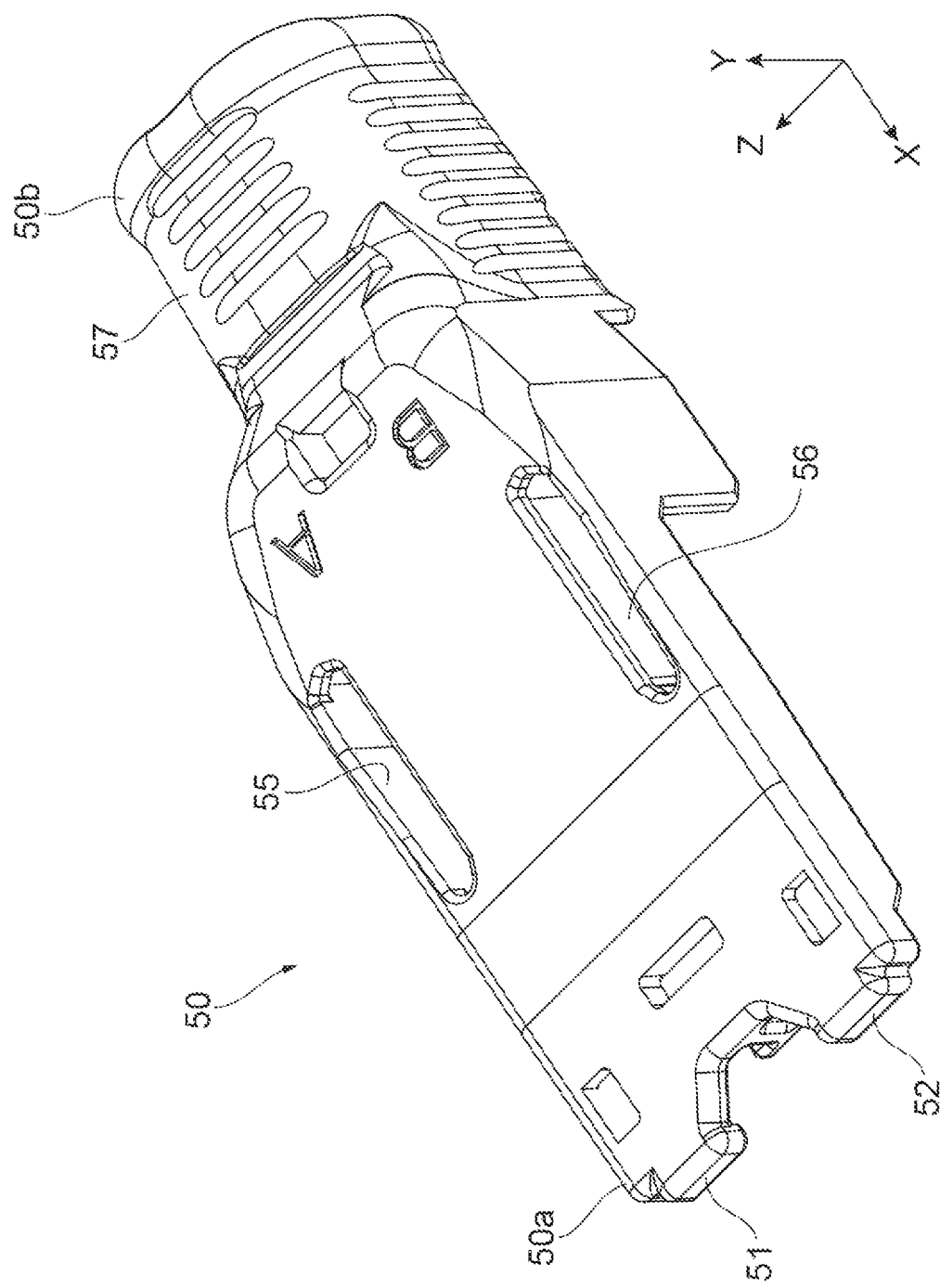
FIG. 10 is a perspective view illustrating a tab.
Figure 11:
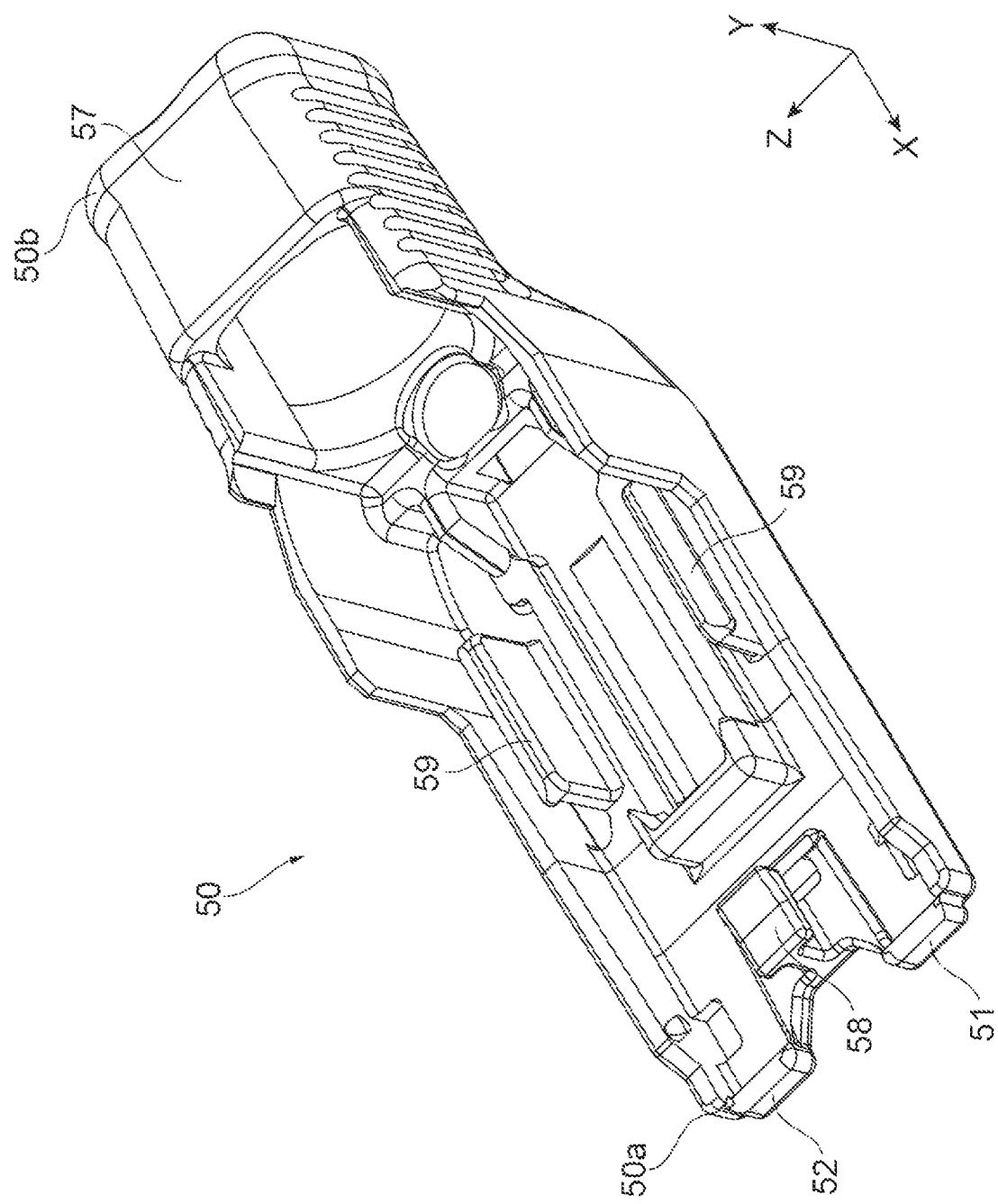
FIG. 11 is a perspective view illustrating the tab.

A configuration of the tab 50 will be described with reference to FIGS. 10 and 11. FIGS. 10 and 11 are perspective views illustrating the tab. The tab 50 is disposed outside the outer housing 30 so as to be arranged with respect to the outer housing 30 in the up-down direction Y and to cover portions except the engaging portions 43 and 44. In the present embodiment, the tab 50 is disposed to face the upper surface 30a. The tab 50 exposes the side surfaces of the outer housing 30 facing each other in the lateral direction Z, and the lower surface 30b. A protrusion portion 58 located on an inner side of a front end 50a of the tab 50 is connected to the protrusion portion 34 located on the upper surface 30a of the outer housing 30, and a pair of latches 59 located on the right and the left of an inner side of the tab 50 are caught in the respective slits 35 from the inside, the slits 35 being located on the right and the left of the upper surface 30a of the outer housing 30. Accordingly, the tab 50 is connected to the outer housing 30 so as to be movable with respect to the outer housing 30 along the longitudinal direction X. The tab 50 is configured to push down the engaging portions 43 and 44 of the latch 40 toward the front housings 10 and 11 in the up-down direction Y in response to a movement of the tab 50 in a direction from the front end 1a toward the rear end 1b along the longitudinal direction X. More specifically, projections 51 and 52 protruding downward are provided at the front end 50a of the tab 50, and when the tab 50 moves rearward, the projections 51 and 52 move rearward along the inclined surfaces 41b and 42b of the latch 40, respectively, and accordingly, the engaging portions 43 and 44 of the latch 40 are pushed down.

A pair of the slits 55 and 56 are provided in a central portion of the tab 50. The guide projections 37 of the outer housing 30 described above are disposed in the respective slits 55 and 56. The guide projections 37 slide in the respective slits 55 and 56 to guide a movement of the tab 50 along the longitudinal direction X. A grip portion 57 is provided at a rear end 50b of the tab 50. When the optical connector 1 attached to the adapter 100 (refer to FIG. 9) is removed from the adapter 100, a worker grips and pulls the grip portion 57 rearward, so that the projections 51 and 52 perform the above-described operation, and the engagement of the latch 40 is released. The grip portion 57 according to the present embodiment has a tubular shape that is curved round such that the worker can grip the grip portion 57 in at least one direction of the up-down direction Y and the lateral direction Z.

The boot 60 and the cable holding member 80 are members that introduce the optical cable K to the optical connector 1 and that fix the optical cable K at a predetermined position inside the optical connector 1. The boot 60 is accommodated inside the grip portion 57 of the tab 50. A part of the boot 60 and the cable holding member 80 are accommodated inside the outer housing 30.

Subsequently, in the optical connector 1 having the above configuration, an operation of attaching and removing the outer housing 30 to and from the inner housing 20 will be described. When the outer housing 30 is attached to the inner housing 20, the worker moves the outer housing 30 toward the front end 1a along the longitudinal direction X to couple the inner housing 20 with the outer housing 30. More specifically, the outer housing 30 is moved toward the front end 1a along the longitudinal direction X such that the rear end portion 23 of the inner housing 20 is inserted into the opening 31 formed in the front of the outer housing 30. At that time, each of the engaging portions 28b of the latches 28 is caught in the corresponding slit 38 and engages with the slit 38. Accordingly, the latches 28 of the inner housing 20 engage with the outer housing 30. Accordingly, the unintentional extraction of the outer housing 30 from the inner housing 20 is prevented.

When the outer housing 30 is moved such that the rear end portion 23 of the inner housing 20 is inserted into the opening 31 of the outer housing 30, an end edge of the opening 30e moves toward the front end 1a along the inclined surface 26b of the projection 26, and an end edge of the opening 30f moves toward the front end 1a along the inclined surface 27b of the projection 27. As a result, the projection 26 and the projection 27 enter and engage with the opening 30e and the opening 30f, respectively. At this time, the inclined surface 26a engages with the opening 30e to restrict the extraction of the inner housing 20 from the outer housing 30, and the inclined surface 27a engages with the opening 30f to restrict the extraction of the inner housing 20 from the outer housing 30.

When the outer housing 30 is removed from the inner housing 20, the worker moves the outer housing 30 toward the rear end 1b along the longitudinal direction X to separate the outer housing 30 from the inner housing 20. At that time, the worker moves the outer housing 30 in a direction toward the rear end 1b along the longitudinal direction X while pushing each of the pushing portions 39 in the direction of arrow S1. At this time, each of the pushing portions 39 pushes each of the body portions 28a of the latches 28. The engaging portions 28b of the inner housing 20 are pushed to the inside of the inner housing 20 in connection with the pushing of the pushing portions 39. As a result, each of the engaging portions 28b disengages from the corresponding slit 38, and the state of engagement between the latches 28 of the inner housing 20 and the slits 38 of the outer housing 30 is released.

When the outer housing 30 is removed from the inner housing 20, the worker moves the outer housing 30 toward the rear end 1b along the longitudinal direction X to cause the projections 26 and 27 to disengage from the openings 30e and 30f and to release the state of engagement between the projections 26 and 27 and the openings 30e and 30f. More specifically, the end edge of the opening 30e moves close to the rear end 1b along the inclined surface 26a of the projection 26, and the end edge of the opening 30f moves close to the rear end 1b along the inclined surface 27a of the projection 27. As a result, the projection 26 and the projection 27 disengage from the opening 30e and the opening 30f, respectively. In such a manner, the state of engagement between the pair of projections 26 and 27 and the pair of openings 30e and 30f is released by applying a force along the longitudinal direction X.

Figure 12:
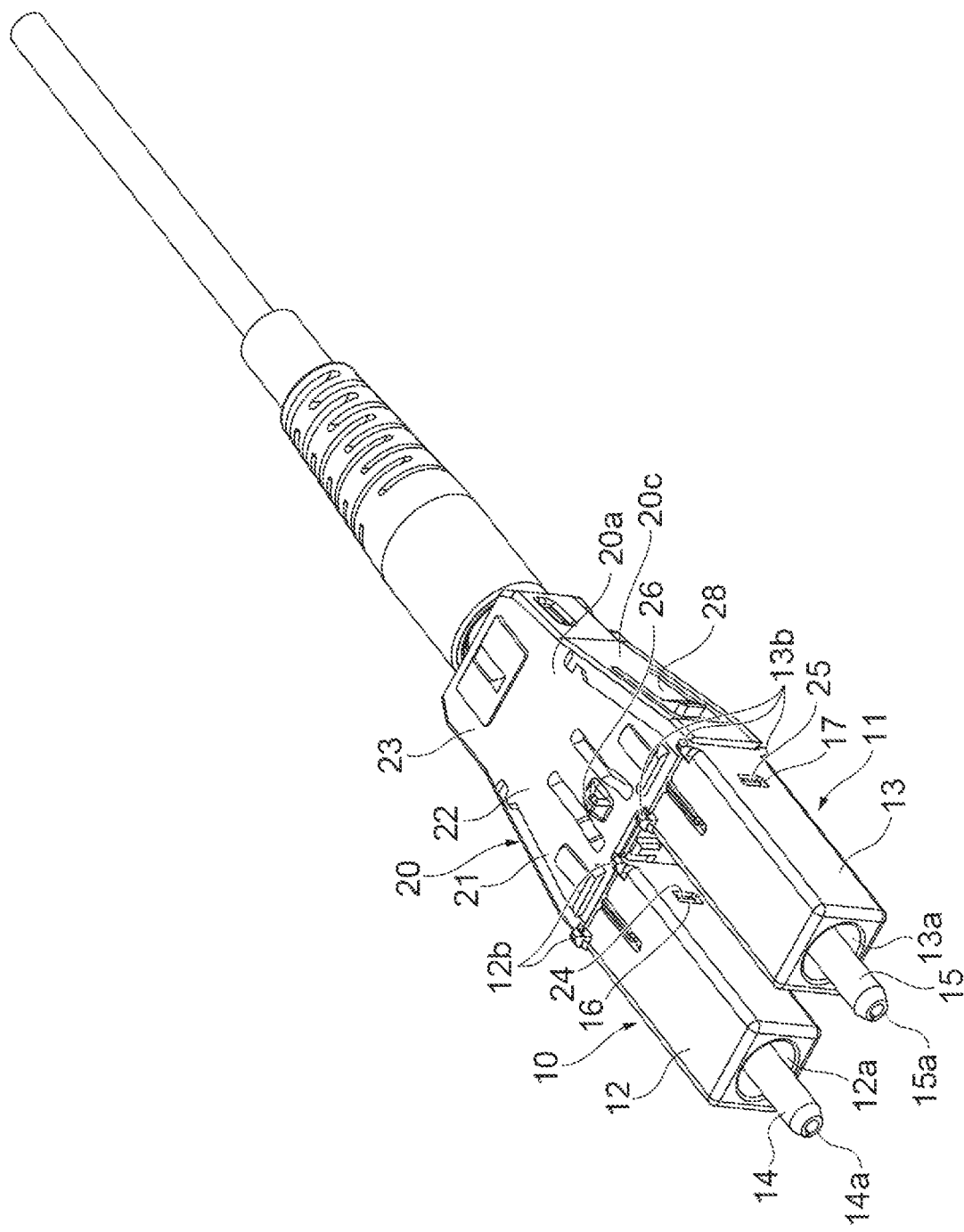
FIG. 12 is a perspective view illustrating a configuration of a front housing and the inner housing.
Figure 13:
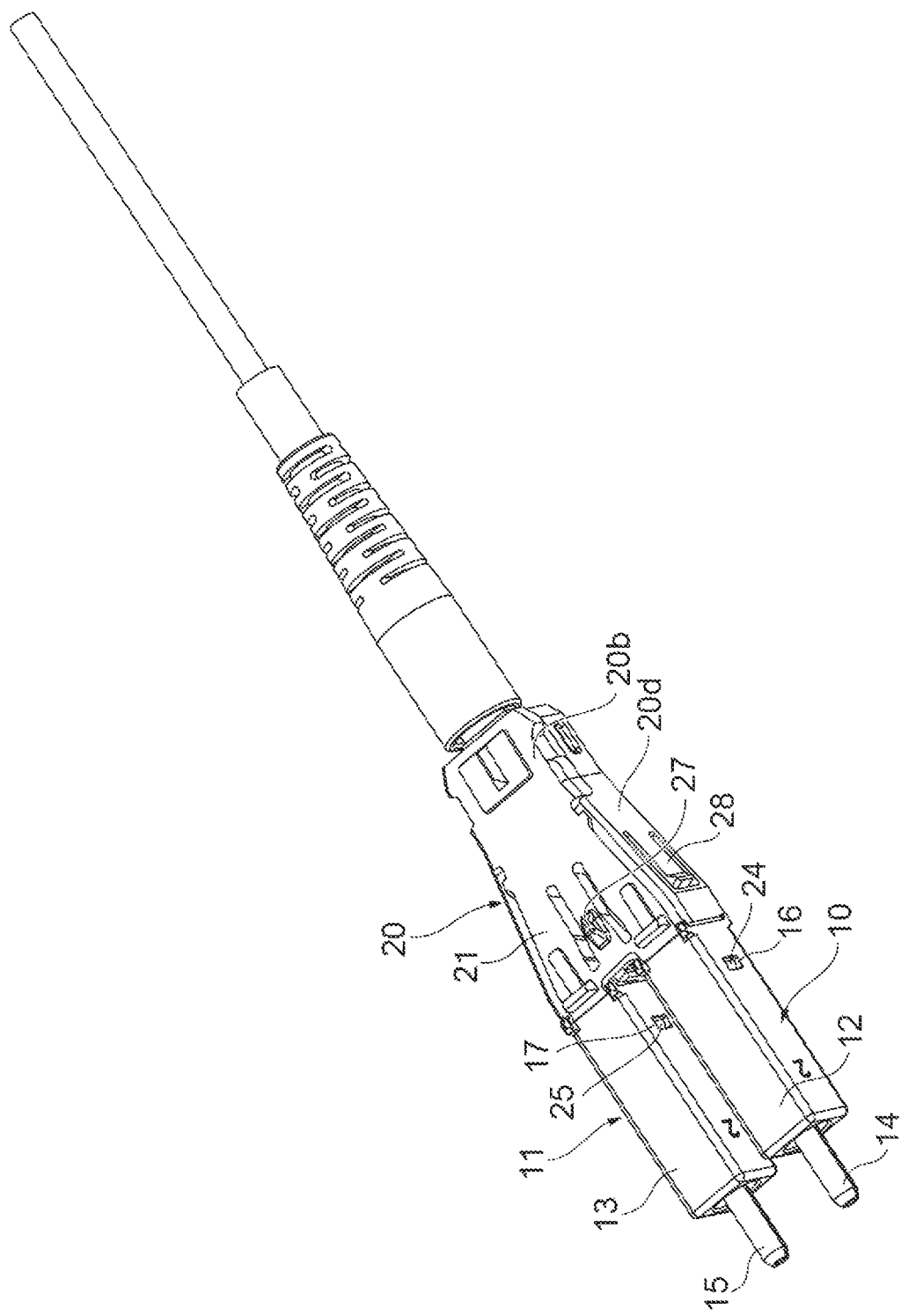
FIG. 13 is a perspective view illustrating a configuration of the front housing and the inner housing.
Figure 14:
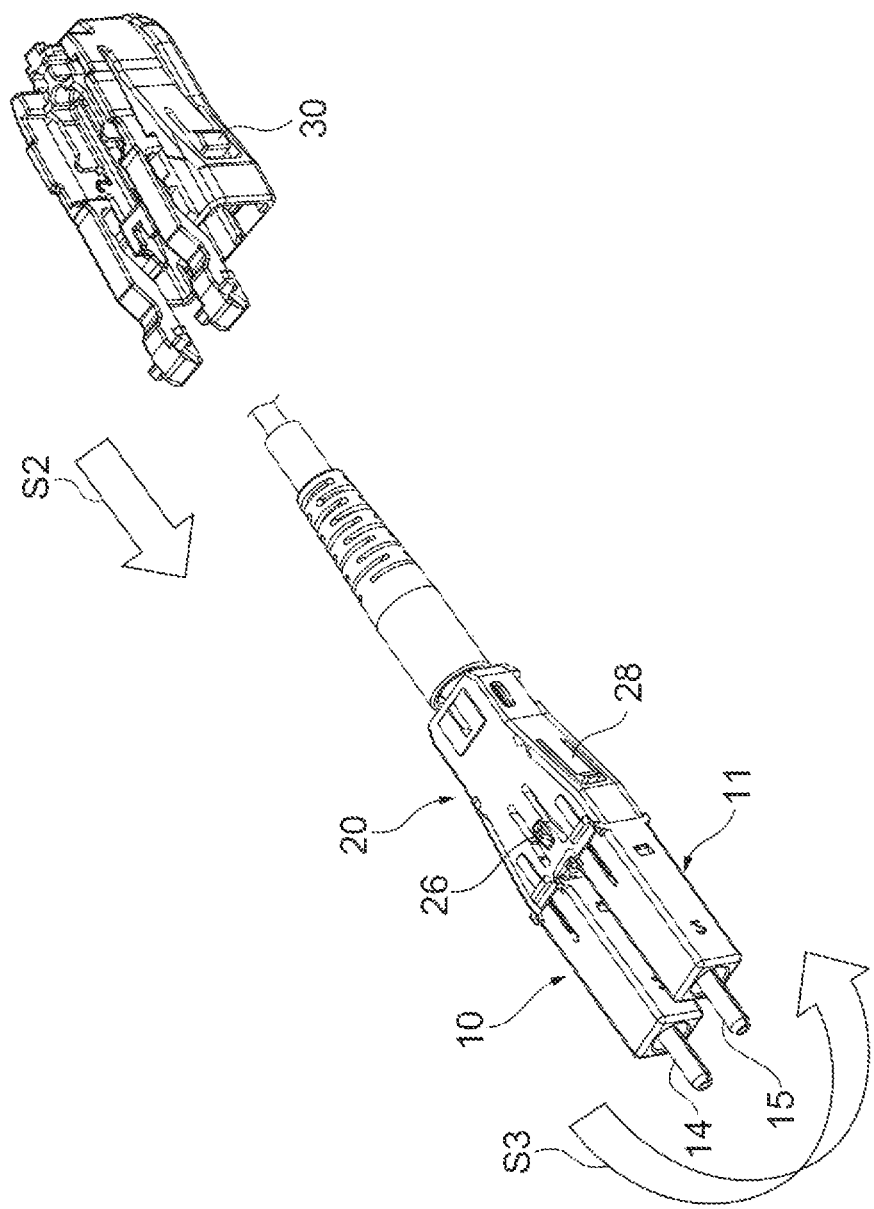
FIG. 14 is a view illustrating an operation for changing a polarity of optical fibers.
Figure 15:
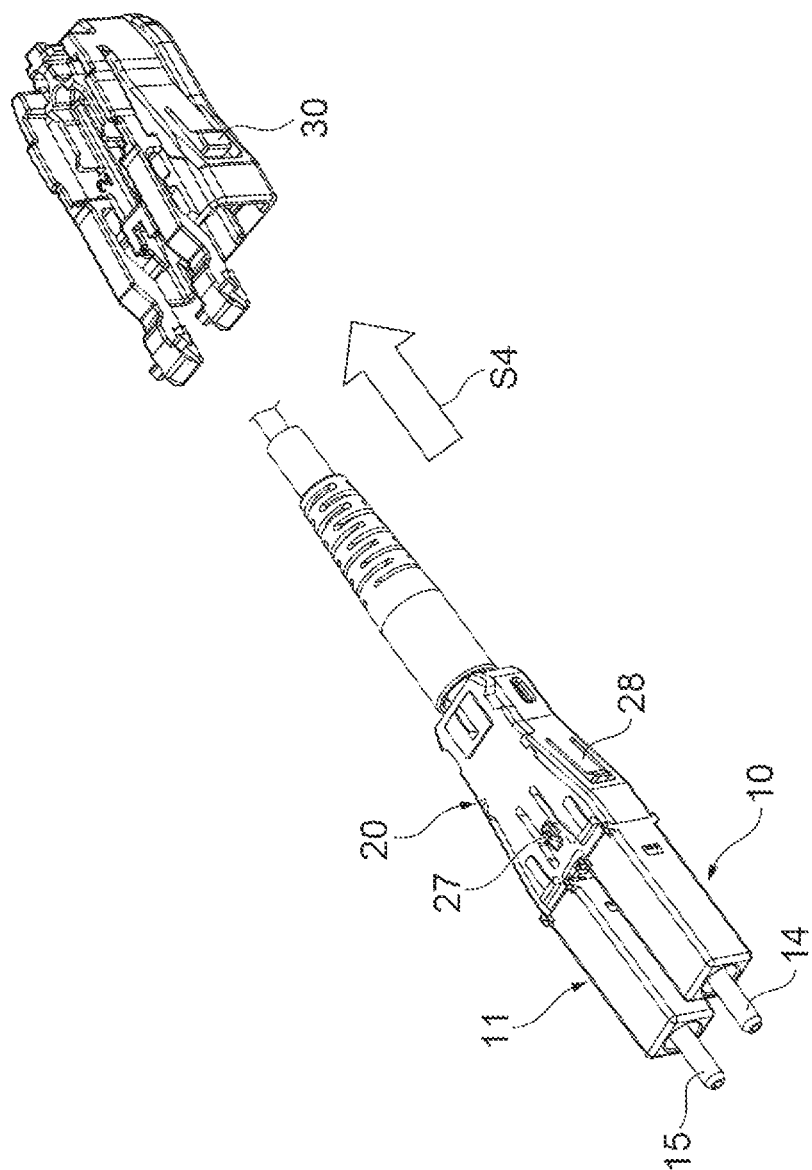
FIG. 15 is a view illustrating the operation for changing the polarity of the optical fibers.

Next, in the optical connector 1 having the above configuration, an operation of changing a polarity of the optical fibers held by the ferrules 14 and 15 will be described with reference to FIGS. 12 to 15. FIGS. 12 and 13 are perspective views illustrating a configuration including both the front housings and the inner housing. FIGS. 14 and 15 are views illustrating an operation for changing a polarity of the optical fibers. Here, the polarity refers to an arrangement order of the front housings 10 and 11 in the lateral direction Z when placed such that the latch 40 faces upward.

As illustrated in FIGS. 12 and 13, the optical connector 1 includes the ferrules 14 and 15 that accommodate the respective optical fibers. In work of connecting the optical connector 1, not only the optical connector 1 may be connected to the adapter 100 (refer to FIG. 9) with a polarity illustrated in FIG. 12, but also polarity change may be performed and the optical connector 1 may be connected to the adapter 100 with a polarity illustrated in FIG. 13 that is different from the polarity mentioned above. In the present embodiment, the polarity change means, for example, that the positions of a transmitting optical fiber and a receiving optical fiber are reversed in the lateral direction Z with reference to the position of the latch 40. Therefore, as illustrated in FIG. 14, first, the front housings 10 and 11 and the inner housing 20 are moved in a direction indicating a direction of arrow S2 while pushing each of the pushing portions 39 of the outer housing 30 to the inside of the outer housing 30, and the front housings 10 and 11 and the inner housing 20 are removed from the outer housing 30.

Subsequently, the front housings 10 and 11 and the inner housing 20 are reversed by being rotated 180° around the central axis parallel to the longitudinal direction X, in the direction of arrow S3. Then, as illustrated in FIG. 15, the front housings 10 and 11 and the inner housing 20 that are reversed are moved in a direction indicating a direction of arrow S4, and are inserted and connected to the outer housing 30 again. In such a manner, in the optical connector 1, the polarity can be easily changed.

As described above, in the optical connector 1 according to the present embodiment, the engaging portions 28b of the latches 28 included in the inner housing 20 are pushed to the inside of the inner housing 20 to release the state of engagement between the inner housing 20 and the outer housing 30. Namely, in a state where the engaging portions 28b of the latches 28 are not pushed to the inside of the inner housing 20, the state of engagement between the inner housing 20 and the outer housing 30 is not released. For this reason, in the optical connector 1, when the optical connector 1 is removed from an external device such as the adapter 100, even in a case where a force is applied to the optical connector 1 in an oblique direction, the state of engagement between the inner housing 20 and the outer housing 30 is difficult to release. In the optical connector 1, the latches 28 are disposed on the side portions 20c and 20d, respectively. The side portions 20c and 20d are arranged in the lateral direction Z and the tab 50 is not provided on the side portions 20c and 20d, and the latches 28 are exposed from the tab 50. Accordingly, the latches 28 can be easily pinched with the fingers, and the latches 28 can be easily pushed to the inside of the inner housing 20.

In the optical connector 1, each of the latches 28 includes the body portion 28a that is an elastic body extending toward the front end 1a. The engaging portion 28b is located at the front end of the body portion 28a. In this case, the engaging portion 28b can be elastically pushed to the inside of the inner housing 20 since the body portion 28a is an elastic body.

In the optical connector 1, the outer housing 30 includes the pushing portions 39 that are disposed above the body portions 28a of the latches 28, respectively. The pushing portions 39 protrude to the outside of the outer housing 30. Each of the pushing portions 39 is supported to be elastically pushable toward the inside of the outer housing 30. When the state of engagement between the inner housing 20 and the outer housing 30 is released, each of the pushing portions 39 is configured to push each of the engaging portions 28b to the inside of the inner housing 20 by pushing each of the body portions 28a of the latches 28.

In this case, the engaging portions 28b of the inner housing 20 are pushed to the inside of the inner housing 20 in connection with the pushing of the pushing portions 39 of the outer housing 30. Therefore, the state of engagement between the inner housing 20 and the outer housing 30 can be smoothly released without directly pushing the engaging portions 28b of the inner housing 20 accommodated inside the outer housing 30, and the attachability and detachability of both is improved. In the configuration in which the pushing portions 39 protrude to the outside of the outer housing 30, the worker can easily push each of the pushing portions 39 to the inside of the outer housing 30.

In the optical connector 1, the inner housing 20 includes the projections 26 and 27 that are disposed on the outer surfaces 20a and 20b, respectively, which face each other in the up-down direction Y. The outer housing 30 includes the portions 30c and 30d that face the outer surfaces 20a and 20b of the inner housing 20, respectively. The openings 30e and 30f are formed in the portions 30c and 30d of the outer housing 30, respectively. The projections 26 and 27 include the inclined surfaces 26a and 27a that engage with the openings 30e and 30f, respectively, to restrict the extraction of the inner housing 20 from the outer housing 30. In this case, the engaging force between the inner housing 20 and the outer housing 30 is reliably increased.

In the optical connector 1, each of the engaging portions 28b includes the engaging surface 28c configured to engage with the outer housing 30. The engaging surface 28c is perpendicular to the longitudinal direction X. In this case, the engaging force between the inner housing 20 and the outer housing 30 is more reliably increased.

The embodiment of the present disclosure has been described above in detail, but the present invention is not limited to the embodiment and can be applied to various embodiments.

In the optical connector 1, each of the latches 28 may not include the body portion 28a that is an elastic body extending toward the front end 1a, and the engaging portion 28b may not be located at the front end of the body portion 28a. Even in this case, effects of the embodiment can be obtained as long as the engaging portion 28b is configured to be elastically pushable toward the inside of the inner housing 20.

In the optical connector 1, the outer housing 30 may not include the pushing portions 39 that are disposed above the body portions 28a of the latches 28, and that protrude to the outside of the outer housing 30. Even in this case, the effects of the embodiment can be obtained by directly pushing the latches 28.

In the optical connector 1, the inner housing 20 may not include the projections that are disposed on the outer surfaces 20a and 20b facing each other in the up-down direction Y, and the openings 30e and 30f may not be formed in the portions 30c and 30d of the outer housing 30, the portions 30c and 30d facing the outer surfaces 20a and 20b of the inner housing 20, respectively. Even in this case, the pair of latches 28 of the inner housing 20 and the pair of slits 38 of the outer housing 30 engage with each other, so that a sufficient engaging force between the outer housing 30 and the inner housing 20 can be obtained.

In the optical connector 1, the engaging portion 28b may not include the engaging surface 28c configured to engage with the outer housing 30, and the engaging surface 28c may not be perpendicular to the longitudinal direction X. In another mode, even in a case where the engaging portion 28b engages with the outer housing 30, the effects of the embodiment can be obtained.

What is claimed is:

1. An optical connector which has a front end and a rear end opposite to the front end in a first direction, and into which first and second optical fibers are insertable from the rear end, the connector comprising:
   first and second ferrules holding the first and second optical fibers respectively;
   first and second front housings each accommodating a corresponding ferrule of the first and second ferrules inside;

an inner housing connected to rear ends of the first and second front housings;

an outer housing including a first latch which protrudes toward the front end along the first direction and of which a tip portion is configured to be engageable with an external device, the outer housing accommodating the inner housing inside; and a tab disposed in a second direction intersecting the first direction with respect to the outer housing, the tab being configured to move rearward along the first direction with respect to the outer housing to release a state of engagement between the first latch and the external device, wherein the inner housing is configured to be insertable into and extractable from the outer housing in the first direction such that a polarity of the first and second front housings is changeable, by rotating 180° around a central axis along the first direction with respect to the outer housing, the inner housing includes second latches that are disposed on first and second side portions respectively, the first and second side portions are arranged in a third direction intersecting both the first direction and the second direction, and the second latches are exposed from the tab, the second latches include respective engaging portions that are engageable with the outer housing to restrict an extraction of the inner housing from the outer housing, each of the engaging portions is configured to be elastically pushable toward an inside of the inner housing, and each of the engaging portions is pushed toward the inside of the inner housing to release a state of engagement between the inner housing and the outer housing.

2. The optical connector according to claim 1,
wherein the second latches include respective body portions, and each of the body portions is an elastic body extending toward the front end, and each of the engaging portions is located at a front end of each of the body portions.

3. The optical connector according to claim 2,
wherein the outer housing includes first and second pushing portions that are disposed above the body portions of the second latches respectively, and the first and second pushing portions protrude to an outside of the outer housing, each of the first and second pushing portions is supported to be elastically pushable toward an inside of the outer housing, and when the state of engagement between the inner housing and the outer housing is released, each of the first and second pushing portions is configured to push each of the engaging portions to the inside of the inner housing by pushing each of the body portions of the second latches.

4. The optical connector according to claim 3,
wherein the outer housing has first and second slits as a structure for engagement with the second latches, each of the first and second slits forms a contour of each of the first and second pushing portions.

5. The optical connector according to claim 2,
wherein the body portions are integrated with portions of the inner housing other than the second latches at a rear end of the second latches.

6. The optical connector according to claim 2,
wherein the body portions and the engaging portions are integrally formed, and the body portions are continuous with the engaging portions.

7. The optical connector according to claim 1,
wherein the inner housing includes first and second projections disposed on first and second outer surfaces facing each other in the second direction respectively, the outer housing includes first and second portions facing the first and second outer surfaces of the inner housing respectively, and an opening is formed in each of the first and second portions of the outer housing, and each of the first and second projections includes an inclined surface that engages with the opening to restrict the extraction of the inner housing from the outer housing.

8. The optical connector according to claim 1,
wherein each of the engaging portions includes an engaging surface configured to engage with the outer housing, and the engaging surface is perpendicular to the first direction.

9. The optical connector according to claim 1,
wherein a contour of each of the second latches is formed by a slit having a U shape.

10. The optical connector according to claim 1,
wherein the optical connector is a duplex LC connector.

* * * * *